United States Patent
Nakagama

(10) Patent No.: US 8,437,017 B2
(45) Date of Patent: May 7, 2013

(54) PRINTING APPARATUS AND COMPUTER PROGRAM PRODUCT FOR DISPLAYING BITMAP OF OPERATION SCREEN FROM RASTERIZED PDL AND CONTROLLING LAYOUT

(75) Inventor: Kiyohari Nakagama, Killara (AU)

(73) Assignee: Konica Minolta Business Technologies, Inc. (JP)

( * ) Notice: Subject to any disclaimer, the term of this patent is extended or adjusted under 35 U.S.C. 154(b) by 468 days.

(21) Appl. No.: 12/720,626

(22) Filed: Mar. 9, 2010

(65) Prior Publication Data

US 2010/0238469 A1  Sep. 23, 2010

(30) Foreign Application Priority Data

Mar. 19, 2009 (JP) .................. 2009-068562

(51) Int. Cl.
 *G06F 3/00* (2006.01)
(52) U.S. Cl.
 USPC ........... 358/1.13; 358/442; 715/700; 715/762
(58) Field of Classification Search .................. 358/1.2, 358/1.9, 3.24, 1.11, 1.13, 1.15–1.18, 501, 358/504, 524, 527, 401, 406, 442, 444, 468, 358/296; 715/200, 204, 249, 255, 264, 265, 715/269, 273, 274, 276, 700, 866, 965, 966, 715/762–763
 See application file for complete search history.

(56) References Cited

U.S. PATENT DOCUMENTS 7,036,084 B2 *  4/2006  Miwa et al. ................... 715/763
2008/0256459 A1  10/2008  Sekiya

FOREIGN PATENT DOCUMENTS

| CN | 1518337 | 8/2004 |
|---|---|---|
| CN | 101267483 | 9/2008 |
| JP | 07-084736 | 3/1995 |
| JP | 2002-182638 | 6/2002 |
| JP | 2003-054066 | 2/2003 |
| JP | 2003-150971 | 5/2003 |
| JP | 2004-007579 | 1/2004 |
| JP | 2004-180275 | 6/2004 |
| JP | 2007-257527 | 10/2007 |
| JP | 2007-334720 | 12/2007 |
| JP | 2008-209679 | 9/2008 |
| JP | 2008-262309 | 10/2008 |
| JP | 2009187128 A * | 8/2009 |

OTHER PUBLICATIONS

The First Office Action for application No. 201010135188.2, mailed Apr. 12, 2012, 5 pgs, State Intellectual Property Office of People's Republic of China.

(Continued)

*Primary Examiner* — Scott A Rogers
(74) *Attorney, Agent, or Firm* — Squire Sanders (US) LLP

(57) ABSTRACT

Print data for display in which an operation screen of a multifunction periphery is described in a page-description language is created and outputted to an external memory medium. Specifically, the print data for display includes a screen description section 51 where an image is described by vector information and a function description section 52 where a function of the operation screen (operation when the operation button is pressed) is described by PJL. In another multifunction periphery, a bitmap image of an operation screen 60 is created and displayed by rasterizing the screen description section 51 of the print data for display read from the external memory medium, and the function of the operation screen is reproduced from information of the function description section 52.

20 Claims, 16 Drawing Sheets

OTHER PUBLICATIONS

Translation of the First Office Action for application No. 201010135188.2, mailed Apr. 12, 2012, 10 pgs, State Intellectual Property Office of People's Republic of China.
Japanese Notice of Reasons for Refusal issued by JPO on Nov. 2, 2010, in connection with Appl. No. 2009-068562, 3 pgs.
Translation of Japanese Notice of Reasons for Refusal issued by JPO on Nov. 2, 2010, in connection with Appl. No. 2009-068562, 4 pgs.
Japanese Notice of Reasons for Refusal drafted by JPO on Dec. 28, 2012, in connection with Appl. No. 2012-131303, 3 pgs.
Translation of Japanese Notice of Reasons for Refusal drafted by JPO on Dec. 28, 2012, in connection with Appl. No. 2012-131303, 3 pgs.

* cited by examiner

FIG. 10

```
                    P1
                    ↓
                                                         70
┌─────────────┬──────────────────────────────────────┐
│ DISPLAY JOB │ READY FOR COPYING      NUMBER        │
│             │                        OF SHEETS   1 │
│ SETTING     │ BASIC  DESIGNATE IMAGE QUALITY ADVANCED│
│ DETAILS     │ SETTING DOCUMENT /DENSITY    SETTING │
│             │ ┌──────┬──────┬────────┬────────────┐│
│ REGIS-      │ │COLOR │SHEET │MAGNIFI-│BOTH SIDES/ ││
│ TRATION     │ │      │      │CATION  │ACCUMULATE  ││
│ ORIGIN STATUS│ │TWO   │      │        │            ││
│             │ │COLORS│      │        │SINGLE SIDE>││
│             │ │BLACK │1 A4  │ 100%   │BOTH SIDES  ││
│             │ │AND RED│ SEF │        │  2 in 1    ││
│             │ └──────┴──────┴────────┴────────────┘│
│   ↑    ↓    │ ┌────────┬───────────────┬──────────┐│
│   DELETE    │ │FINISH  │CONTINUOUS     │NOT       ││
│             │ │QUALITY │READING SETTING│ROTATED   ││
│ JOB DETAILS │ 2009/03/25 24:00    PAGE    LAYOUT OF│
│             │ MEMORY REMAINING 100% EDITING IMAGE  │
└─────────────┴──────────────────────────────────────┘
                                  ↓
                                                         72
┌─────────────┬──────────────────────────────────────┐
│ DISPLAY JOB │ SELECT BOX FOR TEXT TO BE USED. NUMBER│
│             │ BOX TO BE USED CAN BE DESIGNATED  OF │
│ SETTING     │ BY BOX NUMBER THROUGH TEN KEY. SHEETS│
│ DETAILS     │                                    1 │
│             │    SHARE    SYSTEM    BOX RELEASE    │
│ REGIS-      │  ┌────────┬──────────────┬─────────┐ │
│ TRATION     │  │BULLETIN│POLLING       │SECURITY ││73
│ ORIGIN STATUS│ │BOARD BOX│TRANSMISSION BOX│TEXT BOX│
│             │  │FORCED  │              │         │ │
│             │  │MEMORY  │FILING        │RESEND   │ │
│             │  │RECEIVING BOX│NUMBER BOX│BOX     │ │
│             │  │CIPHER  │CIPHER        │EXTERNAL │ │
│             │  │PDF BOX │PDF BOX       │MEMORY   │ │
│   ↑    ↓    │  │DESIGNATE BOX NUMBER │ □         │ │
│   DELETE    │                                      │
│             │ 2009/03/25 24:00       CANCEL   OK   │
│ JOB DETAILS │ MEMORY REMAINING 100%                │
└─────────────┴──────────────────────────────────────┘
```

PRINTING APPARATUS AND COMPUTER PROGRAM PRODUCT FOR DISPLAYING BITMAP OF OPERATION SCREEN FROM RASTERIZED PDL AND CONTROLLING LAYOUT

This application is based on Japanese Patent Application No. 2009-068562 filed on Mar. 19, 2009, in Japanese Patent Office, the entire content of which is hereby incorporated by reference.

BACKGROUND OF THE INVENTION

The present invention relates to the program for creating the display data of the operation screen of a printing apparatus having an operation display, and a printing apparatus.

TECHNICAL FIELD

In recent years, printing equipment equips various functions which enable various settings in details. At the same time, setting operation tends to be complicated. Thus by enabling customize of the operation screen for each user, usability has been enhanced.

For example, there is an image forming apparatus wherein font sizes and button sizes can be changed; and in case of the font size and button size which do not fit in a standard layout are set, number of display items and operation buttons are reduced so that the font and the button having set size can be displayed, and a layout is changed to omit icons so as to increase a text area (Refer to Unexamined Japanese Patent Application Publication No. 2004-180275).

Also, there is a printing apparatus, where a scanner reads a document on which an operation key layout created by user is described; the operation key layout is recreated on the operation screen; and the user can select function to be assigned to each operation key (Refer to Unexamined Japanese Patent Application Publication No. 2004-7579).

Further, there is a system, where an operation screen in a basic format is sent from a server to an electronic instrument, and the electronic instrument accepts editing operation of the operation screen so that the system provides an operation screen having a layout which the user desires (Refer to Unexamined Japanese Patent Application Publication No. 2003-150971).

In addition, there is a technology to display a screen having a predetermined size on a display device having a different display size (for example, Unexamined Japanese Patent Application Publication No. 2002-182638). Also, there is a technology where one of expand command of a page-description language includes a power control command so as to realize enabling/disabling of a power switch from a terminal device, and switching between enabling and disabling of setting of sleep control (Refer to Unexamined Japanese Patent Application Publication No. H7-84736).

In a method where the layout is changed in case the font size and the button size do not fit in a standard layout, screen data of various layouts have to be prepared in advance.

In a method where a scanner reads a document on which a key layout created by a user is described so as to recreate the key layout on the operation screen, a process related to recreation is complicated and the scanner is necessary.

There can be considered a method that various screens are supplied to the apparatus from a server via a network, however this method cannot be used in case the apparatus is not connected to the network.

Other than the above, there is demand to alter language of the operation screen. For example, in a business trip to overseas, there is a demand that language in the operation section of the apparatus is changes to be a native language. Conventionally, the operation screen was separated into a text section and a section other than the text section i.e. an image section, and the text section is replaced to cope with the language of each country. However, font setting for each language is necessary, thus it was difficult to adapt for all languages.

SUMMARY

The present invention has one aspect to solve the above problems and an object of the present invention is to provide a printing apparatus and a program capable of displaying various operation screens. Also, another object of the present invention is to provide a printing apparatus and a program, wherein preparation of various layout screens and various fonts for languages is not necessary to cope with displaying various operation screens, even in case the apparatus is not in a connection environment with a server.

The above object of the present invention can be attained by the following printing apparatus to which one aspect of the present invention is reflected.

A printing apparatus, comprising:
an operation display section;
a developing section to create a bitmap image by rasterizing print data described in a page-description language;
an input section to input print data for display wherein an operation screen is described in the page-description language, and
a control section to display a bitmap image of the operation screen, which is obtained by rasterizing the print data for display inputted through the input section in the developing section, on the operation display section.

BRIEF DESCRIPTION OF THE DRAWINGS

These and other objects, advantages and features of the invention will become apparent from the following description thereof taken in conjunction with the accompanying drawings in which:

FIG. 10 shows a transition of an operation screen displayed on an operation display section in an example 1;

DETAILED DESCRIPTION OF PREFERRED EMBODIMENTS

The embodiment of present invention will be described with reference to the drawings as follow.

Figure 1:
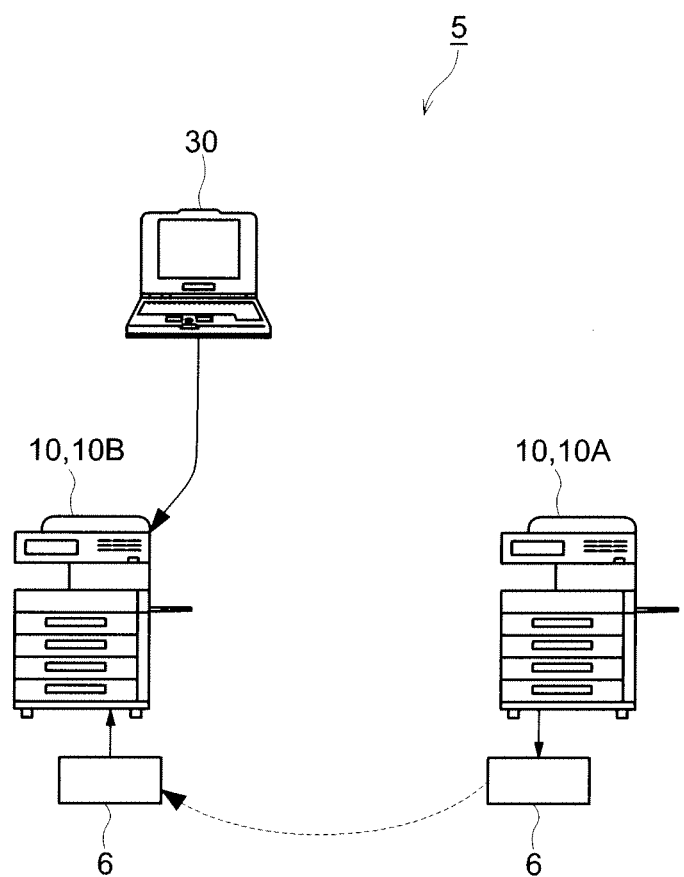
FIG. 1 is an explanatory diagram showing an exemplary system including a multifunction peripheral representing a printing apparatus related to an embodiment of the present invention.

FIG. 1 shows an Exemplary configuration of system 5 including a multifunction periphery 10 representing a printing apparatus related to the present invention. In the system 5, information related to an operation screen of the multifunction periphery 10A is outputted to an external memory medium 6 such as a USB memory and an IC card, then the information is read from the external memory medium 6 so that the operation screen of the multifunction periphery 10A can be reproduced on another multifunction periphery 10B located, for example, in a destination of a business trip.

Specifically, the multifunction periphery 10A creates print data for display in which an operation screen of its own is written in a page-description language and outputs to the external memory medium 6. The multifunction apparatus 10B creates a bit map image of the operation screen by rasterizing the print data for display inputted from the external memory medium 6 and displays it on an operation display section.

Also, it is possible that by creating the print data for display related to a discretional operation screen through an information processing apparatus 30 such as a personal computer, the print data for display is transmitted to the multifunction periphery 10 or transmitted via the external memory medium 6 to display. Further, by sending a control command described in the page-description language from the information processing device 30 to the multifunction periphery 10, the operation screen displayed on the multifunction periphery 10 can be transferred to a designated screen by remote control. In addition, by sending the print data and the control command from the information processing apparatus 30 to the multifunction periphery 10, the designated operation screen can be displayed when (during or after) a print job related to the print data is executed.

Figure 2:
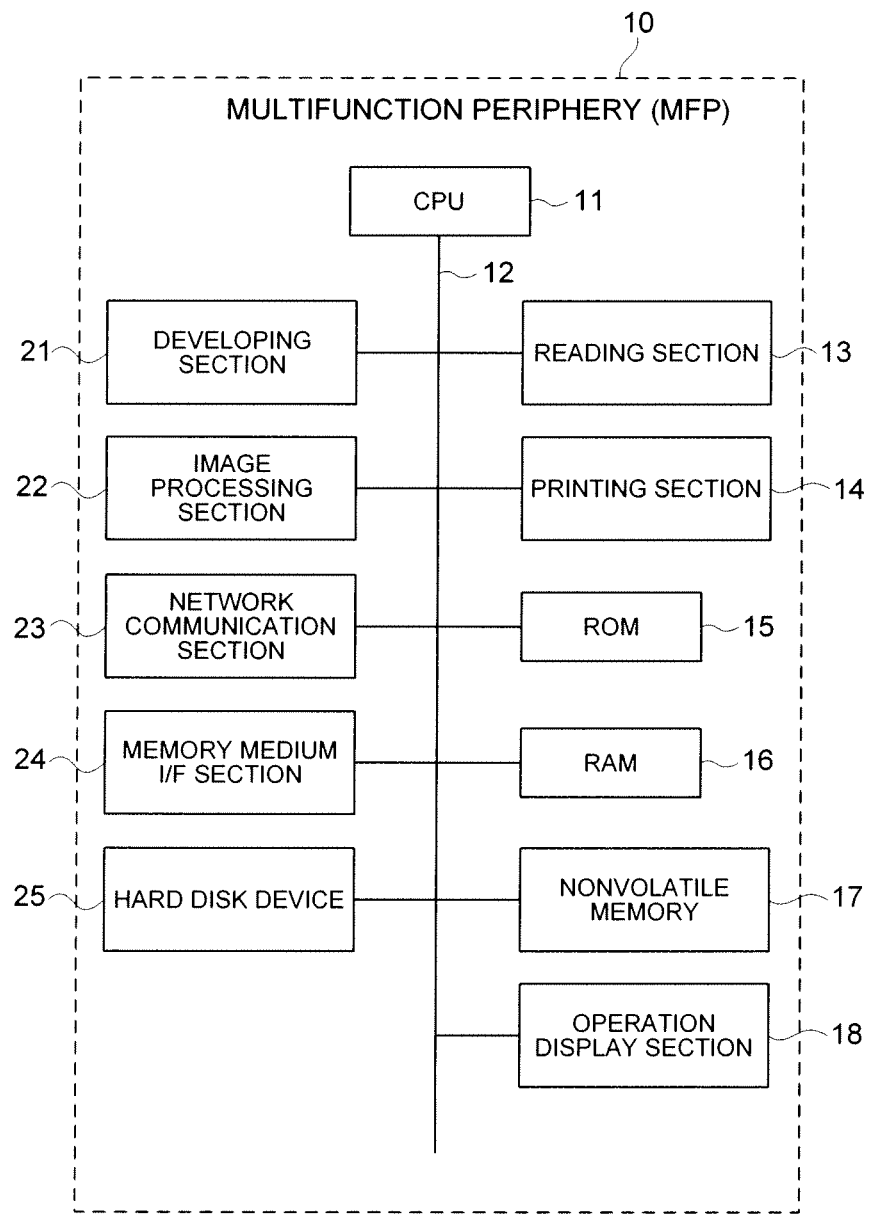
FIG. 2 is a block diagram showing a schematic configuration of a multifunction peripheral.

FIG. 2 is a block diagram to show an schematic configuration of the multifunction periphery 10. The multifunction periphery 10 has a configuration that a CPU (Central Processing Unit) 11 to control operation of the multifunction periphery 10 is connected with a reading section 13, a printing section 14, a ROM (Read Only Memory) 15, a RAM (Random Access Memory) 16, a nonvolatile memory 17, an operation display section 18, a developing section 21, an image processing section 22, a network communication section 23, a memory medium I/F section 24 and a hard disk 25 via a bus 12.

The reading section 13 acquires image data by reading a document image optically. The reading section 13 is provided with, for example, a light source to radiate light to a document, a line image sensor to read the document in a width direction by one line by receiving reflected light from the documents, and an optical system configured with a mirror and a lens to create an image by leading the reflected light from the document to the line image sensor as well as a moving mechanism to successively move a reading position in a longitudinal direction of the document by lines by moving the mirror and the light source.

Printing section 14 forms an image on a recording sheet based on image data through an electrophotographic process. The printing section 14 is configured, for example, so-called as a laser printer provided with a conveyance device of the recording sheet, a photoconductive drum, a charging device, a LD (Laser Diode) controlled to be tuned on and off in accordance with the inputted image data, a scanning unit to scan the laser light radiated from the LD onto the photoconductive drum, a developing device, a transfer separating device, a cleaning device and a fixing device. An other method of the printer such as a LED printer in which LED (Light Emitting Diode) radiate the photoconductive drum instead of the laser light can be used.

In the ROM 15, various programs and fix data are stored. The CPU 11 executes various kinds of processes in accordance with the programs thereof. The RAM 16 is used as a work memory to temporarily store various items of data when the CPU executes the program, and an image memory to temporarily store the image data.

The operation display section 18 serves functions to display various kinds of operation screens, and to receive various kinds of operations from a user. The operation display section 18 is configured with a LCD display representing a display unit, various buttons such as mode selection buttons, a start button, a stop button, and ten keys, as well as a touch panel disposed on a surface of the LCD display to detect a coordinate position having been pressed.

A developing section 21 serves for rasterizing the printing data written in the page-description language and creates a bit map image. The image processing section 22 carries out various kinds of image processing such as image correction, rotation, magnification, contraction, compression and expansion with respect to the image data.

The network communication section 23 serves a function to receive and transmit various kinds of data between an external device such as the image processing device 30 via the network such as a LAN (Local Area Network).

The recording medium I/F section 24, to which the external recording medium can be inserted, serves functions to read and write data from/to an external recording medium 6 inserted therein.

The hard disk device 25 is a large capacity nonvolatile memory device. The hard disk device 25 is used to store the image data of the document read by the reading section 13, printing data received from the information processing device 30, print data for display, a bitmap image data of the operation screen obtained by rasterizing the print data for display, and functional information indicating the operation screen thereof. In the nonvolatile memory 17, besides various setting information and user information, size information (number of dots in lateral and longitudinal directions) of the display screen of LED display possessed by the operation display section 18 are stored.

Figure 3:
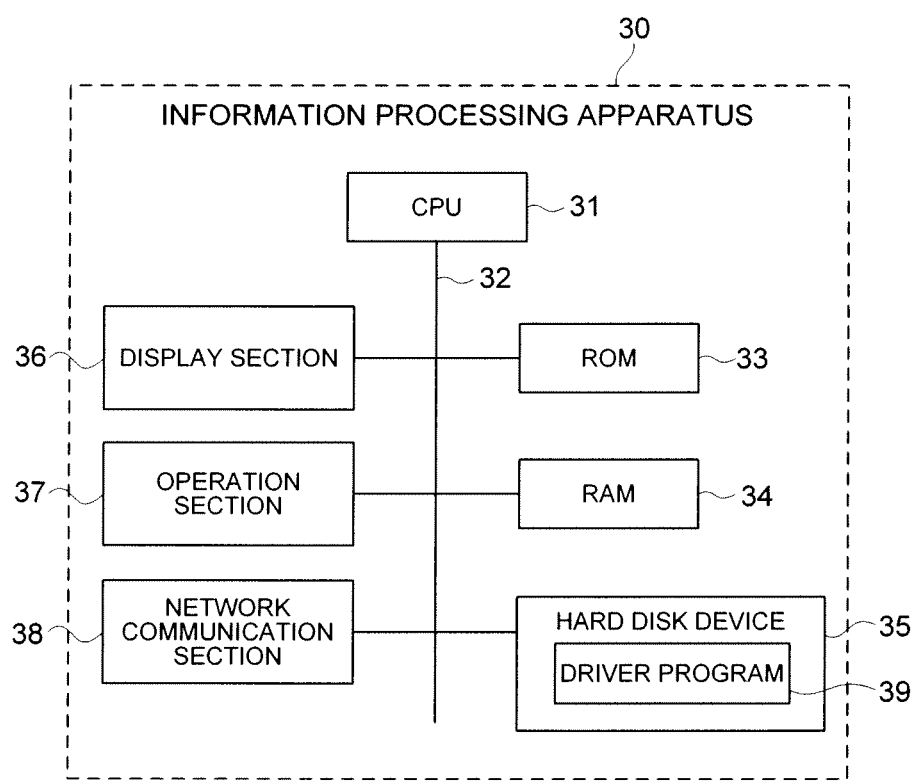
FIG. 3 is a block diagram showing a schematic configuration of an information processing apparatus.

FIG. 3 is a block diagram showing an example of a schematic configuration of the information processing device 30. The information processing device 30 is configured with a general purpose computer having network communication function to which an OS (Operating Program) program, an application program and a driver program of the multifunction periphery 10 are installed. The information processing device 30 is configured by connecting the CPU 31 with a ROM 33, a RAM 34, a hard disk device 35, a display section 36, an operation section 37 and a network communication section 38 via a bus 32.

In the ROM 33, a booting program and various fixed data to be executed by the CPU 31 are stored. In the hard disk device 35, besides the OS program, various kinds of application programs operated on the OS thereof and a driver program 39 of the multifunction periphery 10 are stored. The driver program 39 and the application program are read from the hard disk and developed in the RAM 34, and the CPU 31 executes the program developed in the RAM 34. Also, the RAM 34 is used as a work memory to temporarily store various kinds of data when the CPU 31 executes the program and a communication buffer to temporarily store the data related to receiving and transmitting.

The display section 36 is configured with the LCD display and so forth, and the operation section 37 is configured with a keyboard and a mouse (pointing device). The network communication section 38 serves a function to receive and transmit various kinds of data between the multifunction periphery 10 via the network such as a LAN. In addition a function to write data into the external memory media 6 inserted to the memory medium I/F section 24 and an I/F section and to read data from the external memory media 6 are provided.

The functions related to creation of the display control data, creation of the control command and receiving/sending of the control command in the information processing apparatus 30 is realized by the CPU 31 to execute the driver program 39.

Figure 4:
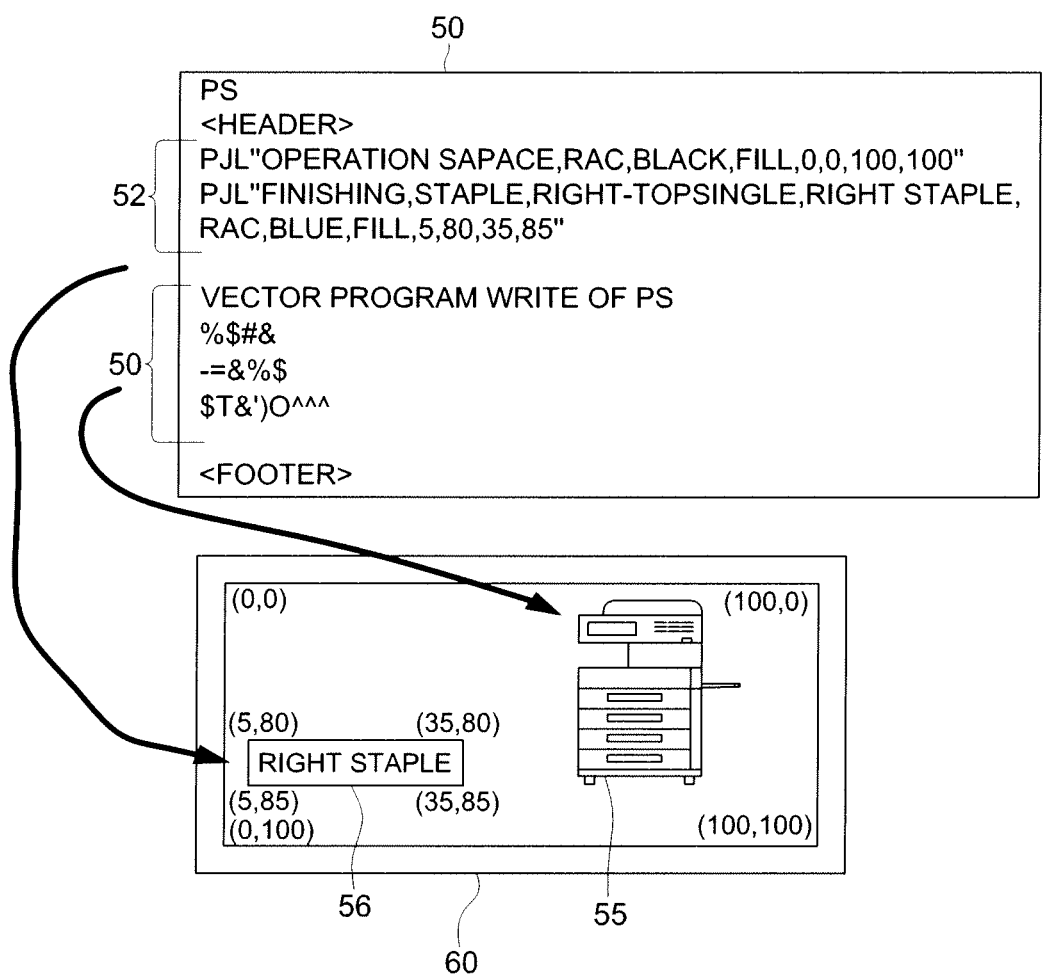
FIG. 4 is am explanatory diagram showing exemplary print data for display and an exemplary operation screen which is reproduced from the print data for display.

FIG. 4 shows an example of printing data for display 50 described in the page-description language in a print format and a display example of the operation screen base on the print data for display. The print data for display 50 includes screen description section 51 where the operation screen is described in a first printing language, and a function description section 52 where a function (function information) related to the operation screen is described in a second printing language.

The first printing language used to describe the screen description section 51 is a printing language which describes description objects such as figures and characters with vector information, for example, PCL (Printer Control Language), PS (Post Script™), and XML (Extensible Markup Language). The second printing language is a printing language for printer control to describe the function description section 52 such as PJL (Printer Job Language) and PDL (Page-description Language). In the function description section 52, information showing a position of an operation button in the operation screen (a relative position with respect to a base point such as upper left of the screen) and information to define action of operation buttons when the buttons are operate. The definition of the action includes, for example, changing color of the operation buttons when the buttons are pressed (instruction of color change and designation of the color), transition to the next operation screen (instruction of screen transition and designation of destination screen), changing parameter value and an instruction to start execution of a job.

By describing the image and function of the operation screen using the above printer languages, compatibilities with the printer driver program to create print data for print and with a program to analyze print data in the multifunction periphery 10 are enhanced. Also by expanding these programs, it can cope with display of the operation screen.

Also, since the image in the operation screen is described by the vector information, the screen describing section 51 can develop a precise bitmap image. Also, since the bitmap image can be magnified in lateral and longitudinal directions when it is developed, the image of the operation screen can be created so as to be adaptable to various display area sizes. Further, in the print data for display 50, since the screen description section 51 describing an image in the operation screen and the function description section 52 describing the function related to the operation button are included, the functions of the image operation screen of the operation screen (in particular, icon and operation button) can be handled as one object.

In an example of FIG. 4, by rasterizing contents of the screen describing section 51, a bit map mage of the operation screen 60 including FIG. 55 of the multifunction periphery and operation button (right staple button 56) is created. Also, function description section 52 indicates positional information of the right staple button 56 (an area in which the right staple button exits is also indicated) and a function (a setting value of the right staple becomes on when pressing).

Figure 5:
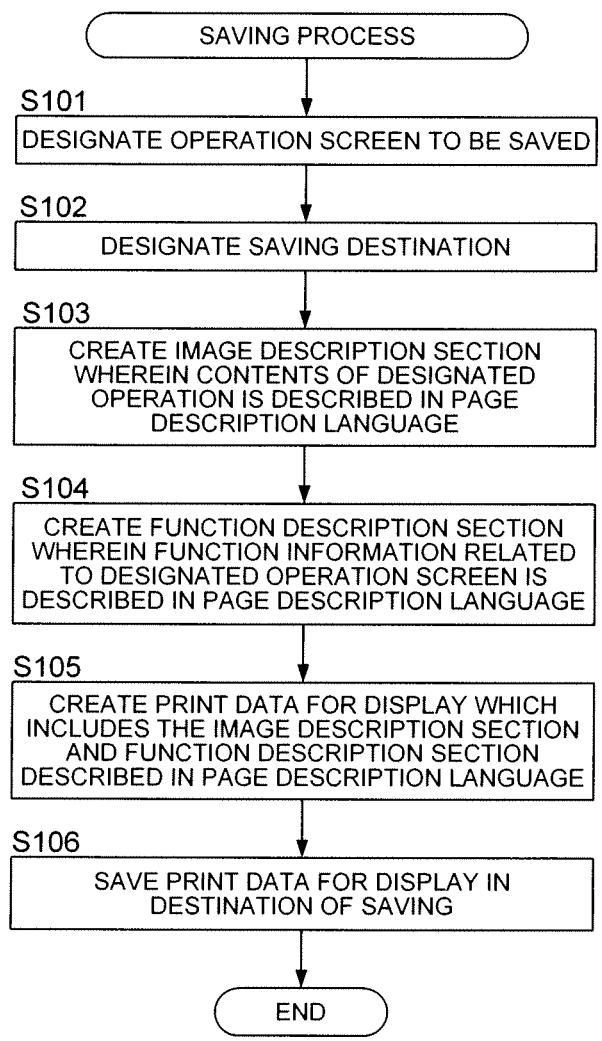
FIG. 5 is a flow chart showing operation when creating the print data for display on an own operation screen of the multifunction periphery by a page-description language.

FIG. 5 shows a behavior of the multifunction periphery 10 to create print data for display where the operation screen of its own is written in the page-description language. First, designation of the operation screen to be preserved (Step S101) and designation of an destination where the print data for display is store are received (Step S102) from a user via the operation display section 18. Thereafter, when an instruction of execution to preserve the operation screen is received, the CPU 11 creates the screen description section 51 where images (background, characters and figures) of a designated operation screen is described in vector information using the languages such as PCL and PS (Step S103). Next, the function description section 52 where functions related to the designated operation screen is written in the printer control language such as PJL (Step S104) is created. Then a print data for display 50 including (correlating) the screen description section 51 created in the Step S103 and the function description section 52 created in Step S104, is created (Step S105), and is outputted to a destination for saving designated in Step S102 (here the external memory medium 6) to be saved (Step S106). A screen ID is assigned for each operation screen so that screen ID of the operation screen indicated by the print data for display 50 is included in the print data for display 50.

The print data for display 50 is created in the information processing apparatus 30 in the same manner. For example, in the information processing device 30, the operation screen written by a drawing software is acquired by a drive program 39, and accepts setting of function (assigning of functions to the operation buttons, setting of screen ID and setting of destination screen) related to each operation button on a screen of the printer driver. Based on the above information, print data for display 50 in a form of FIG. 4 is created. The print data for display 50 having been formed is outputted to the external memory medium 6, or is transmitted to the multifunction periphery 10 via the network.

Figure 6:
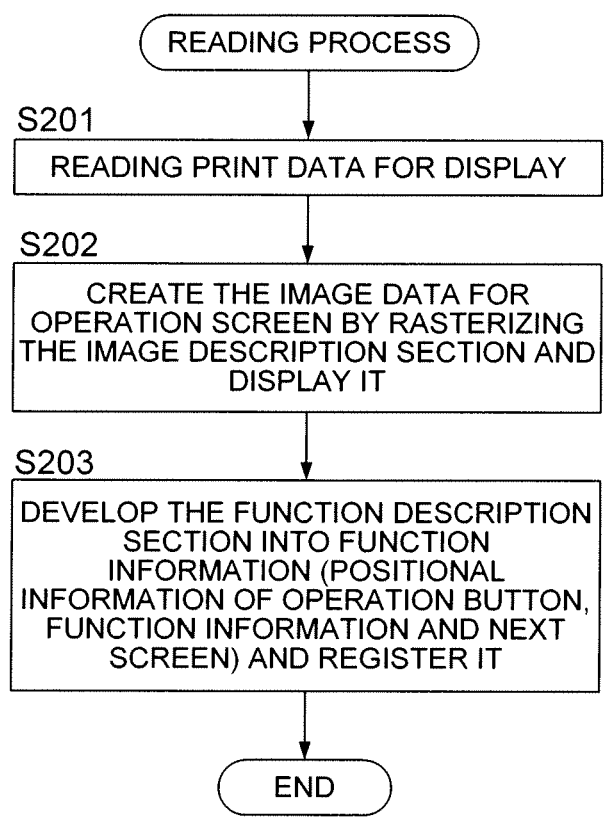
FIG. 6 is a flow chart showing operation of a multifunction periphery in case print data for display is read from an external medium and used.

FIG. 6 shows a behavior of the multifunction periphery 10 in case the print data for display 50 is read from the external memory medium 6 and used. The multifunction periphery 10 reads the print data for display 50 from the external memory medium 6 and so forth (Step S201), and a bitmap image of the operation screen is formed by rasterizing the screen description section 51 and is displayed on the operation section 18 (Step S202). Also, the function display section 52 of the print data for display 50 having been read is analyzed and the function information indicating contents therein (position of the operation button, function information and transition information of next screen) are transformed into an usable data format inside to be stored (Step S203).

Meanwhile, when the screen description section 51 is subject to rasterizing, the size (number of dots in lateral and longitudinal directions) of the bitmap to be created is changed accordingly so that the size (number of dots in lateral and longitudinal directions) of the bitmap coincides with the display area size (number of dots in lateral and longitudinal directions) of the operation display section 18.

Also, for use of later stage, the bitmap image of the operation screen after developing, function information related to the operation screen and the screen ID of the operation screen thereof are correlated and saved in the had disk device 25. Further, for in case another rasterizing is necessary, the print data for display 50 before developing is also correlated with each of the above data and saved. Incidentally, there can be a configuration that when the data is read and developed, displaying on the operation display section 18 is not carried out and only saving is carried out.

A behavior that the print data for display 50 created in the information processing apparatus 30 is read and used in the multifunction periphery 10 is the same as that in FIG. 6, thus description is omitted. However, as reading methods, there are a method of receiving the print data for display 50 from the image processing device 30 via the network and a method where the information processing device 30 writes the print data for display 50 in the external memory medium 6 and the print data for display 50 is read from the external memory medium 6.

Figure 7:
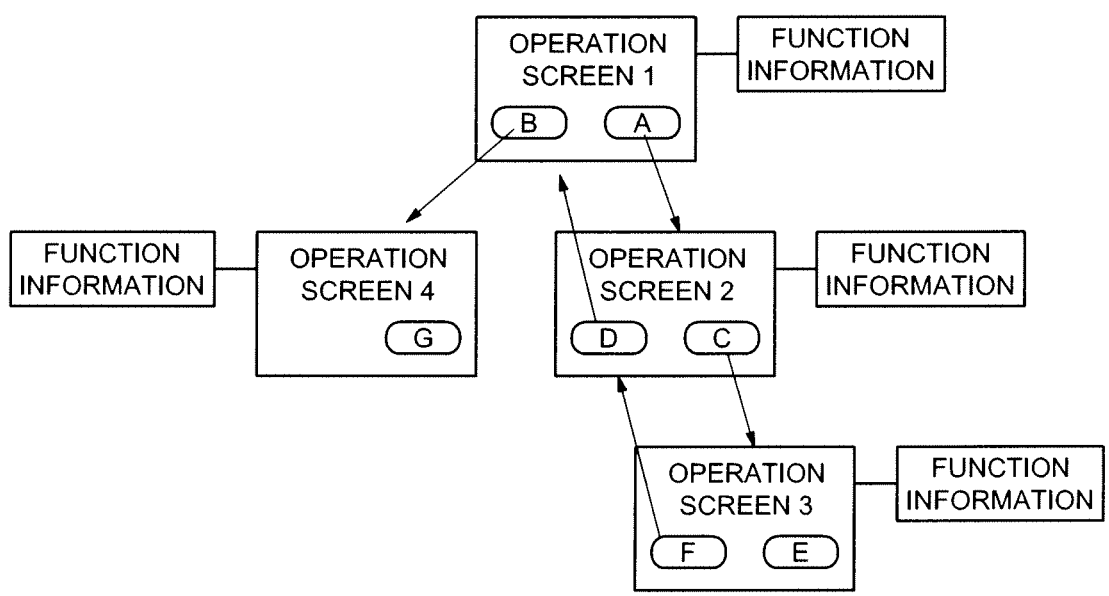
FIG. 7 is an explanatory diagram exemplifying a state where a plurality of sets of bitmap images of operation screens and functional information are store in a hard disk of a multifunction periphery.

FIG. 7 shows a state where a plurality of sets of bitmap images of the operation screens created from the print data for display 50 and function information are stored in a hard disk device 25. The bitmap image of each operation screen and the function information of the operation screen thereof are stored with being correlated. Also, since the function information indicates a transition destination of the operation screen when the operation button is pressed, transition relations of the operation screen (layered structure and linking relations) are also registered by the information. In the example of FIG. 7, arrows show transition relations that when the operation button A in the operation screen 1 is pressed, the screen shifts to an operation screen 2, and when the operation button B in the operation screen 1 is pressed, the screen shifts to an operation screen 4. The above transition relations are defined by the function information. The function information defines the destination operation screen by the screen ID thereof.

The bitmap image of the operation screen and function information (hereinafter called operation screen data) having been saved is used as follow. When display mode changing operation for using operation image data having been saved and initial screen designation operation are received, an designated initial screen is displayed based on the operation screen data and the function information corresponding to the initial screen is enabled. Namely, a position of each button exiting in the operation screen being displayed is recognized based on the function information, and when an area corresponding to any one of the operation button is operated (pressed), a state where an action corresponding to the operation defined by function information is executed is realized. After that, it operates so that every time the operation button is operated, the actions and screen transition corresponding to the function information, transition of the screen are executed, and the function information corresponding to the operation screen of the transition destination is enabled.

Apart from the above usage, by sending a control command from the information processing device 30 which operates based on the driver program 39, the operation screen to be displayed on the operation display section 18 of the multifunction periphery 10 can be designated. For example, when the information processing device 30 sends the control command to instruct displaying the operation screen 3 in a state where the operation screen 1 in FIG. 7 is being displayed, the operation screen 1 can be shifted to the operation screen 3 (without the operation screen 2 being displayed). The control command is described in the same printing language (for example, PJL) as that of the function description section 52 of the print data for display 50. Also, in the control command, the transition destination screen is designated by the screen ID thereof.

For the contents of action to be instructed by the control command, setting is received at a setting screen of the driver program 39 of the information processing device 30, and the driver program 39 creates the corresponding control command and sends to the multifunction periphery 10.

As examples of usage of the control command, there are a case where the control command is sent with the print data and a case where the only control command is sent. Each case will be described as follow.

<Print Data and Control Command are Sent>

Figure 8:
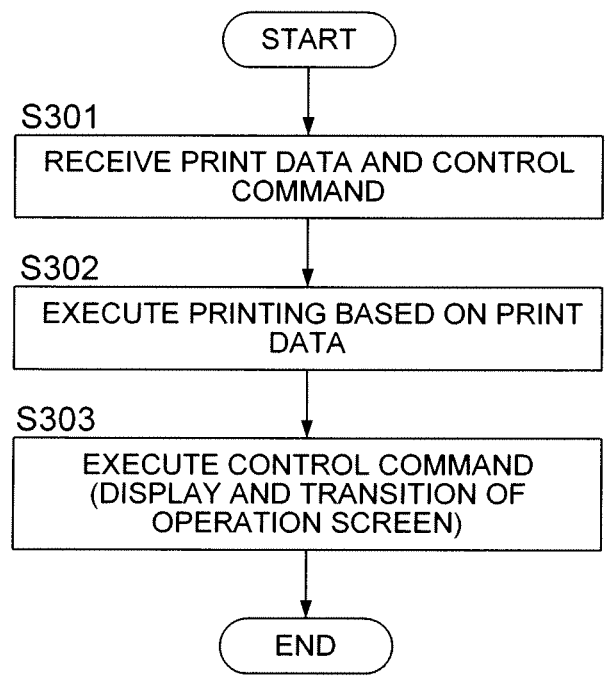
FIG. 8 is a flow chart showing a behavior of a multifunction periphery which received print data and a control command from an information processing apparatus.

FIG. 8 shows a behavior of the multifunction periphery 10 when the print data and control command are received from the information processing device 30. The multifunction periphery 10 receives the print data and the control command from information processing device 30 via a network (Step S301). Then, printing operation based on the received print data is carried out (Step S302). The control command is executed when the printing is carried out then an operation screen designated by the control command is displayed and function information of each screen thereof is enabled (Step S303). The control command can designate the operation screen while executing printing and the transition destination operation screen to be displayed after execution of printing.

A specific example of the above behavior will be described as follow.

Example 1

A case that the operation screen is automatically transmitted an operation screen where a security box is in a selected state after execution printing is executed.

Figure 9:
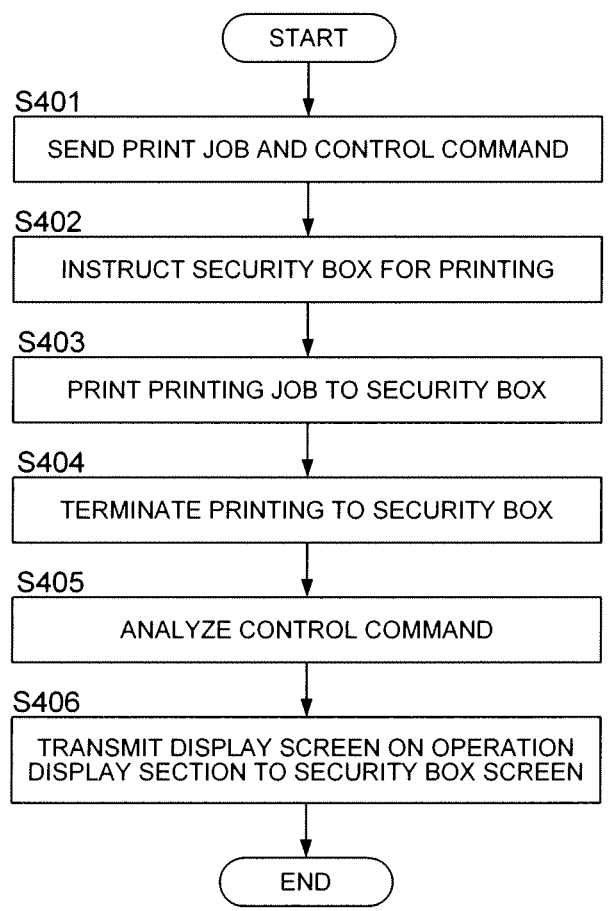
FIG. 9 is a flow chart showing a flow of operation implemented in a system when operation of an example 1 is executed.

FIG. 9 shows operation flow executed in a system 5 to conduct operation of the example 1, and FIG. 10 shows transition of the operation screens to be displayed on the operation display section 18. The information processing device 30 which operates based on the driver program 39 creates and correlates a print job (print data) to instruct security print and a control command to instruct to shift the screen to a display screen of the security box after executing the print job and to make the operation button in the security box in a selected state, and sends them to the multifunction periphery 10 (FIG. 9: Step S401, FIG. 10: P1).

The CPU 11 of the multifunction periphery 10 having received the above command and job, instructs each section to execute the print job so as to start security print. The security print is carried out in a way that the developing section 21 performs rasterizing of the print data to create a bitmap image, the bit map image developed is saved in a security box designated by the CPU 11 (Step S403). For example, as FIG. 10 shows, during security printing, the same operation screen 70 as that of "copy waiting" is displayed on the operation display section 18. Meanwhile, the security box is storing area of image data provided for each user and each group, and use (observing, printing and transmitting) of the stored image data is restricted to only a authorized case through a pass word. A personal box to be described is a security box for personal use. The security box and the personal box are sometime called just a box.

When security printing is completed (Step S404), the CPU 11 analyzes the control command received before hand (Step 405), and displays a security box screen 72 shown in FIG. 10 on the operation display section 18 in accordance with the control command, then enables the function information corresponding to the screen 72 (Step S406). In the security box screen 72, the selection button 73 of the security text box is in a selected state.

Example 2

A case that after box printing is executed, screen shifts to the box screen automatically, or after box printing is executed, the screen shifts automatically to a screen where a password input screen and a thumbnail screen are combined.

Figure 11:
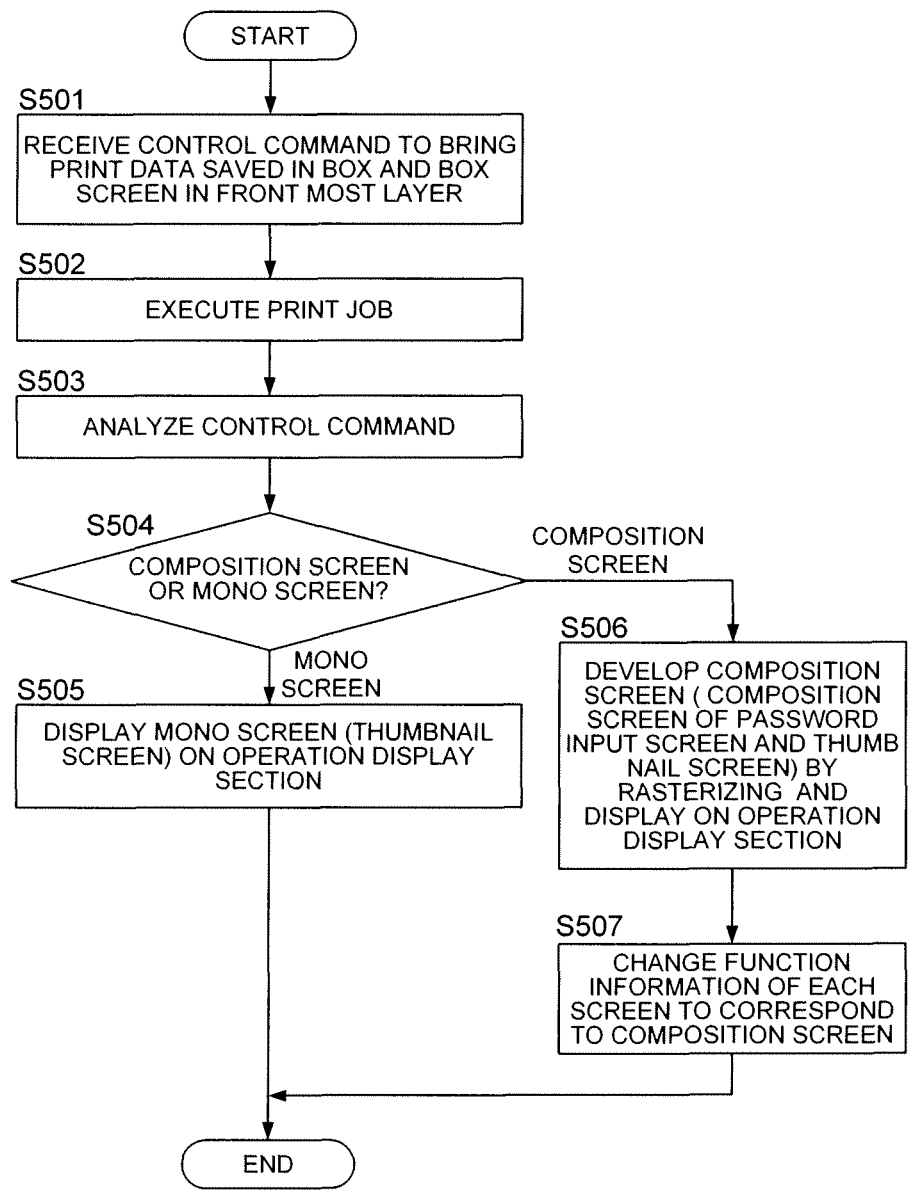
FIG. 11 is a flow chart to show behavior of a multifunction periphery in case operation of an example 2 is executed.

FIG. 11 shows behavior of multifunction periphery 10 to conduct operation of the example 2. The information processing device 30 which operates based on the driver program 39, creates and correlates a print job (print data) to instruct box print and a control command to instruct to shift the screen to a desired operation screen after execution of the print job, then send them to the multifunction periphery 10. The multifunction periphery 10 receives them (FIG. 11: Step 11).

The multifunction periphery conducts the print job (box print) received (Step S502) and after completion of the printing, analyzes the control command received in Step S501 (Step S503). In case the command instructs display of single screen (only thumb nail screen) (Step S504; single body), the single body screen (thumb nail screen) is displayed on the operation display section 18 an enables the function information corresponding to the screen thereof (Step S505).

Figure 12:
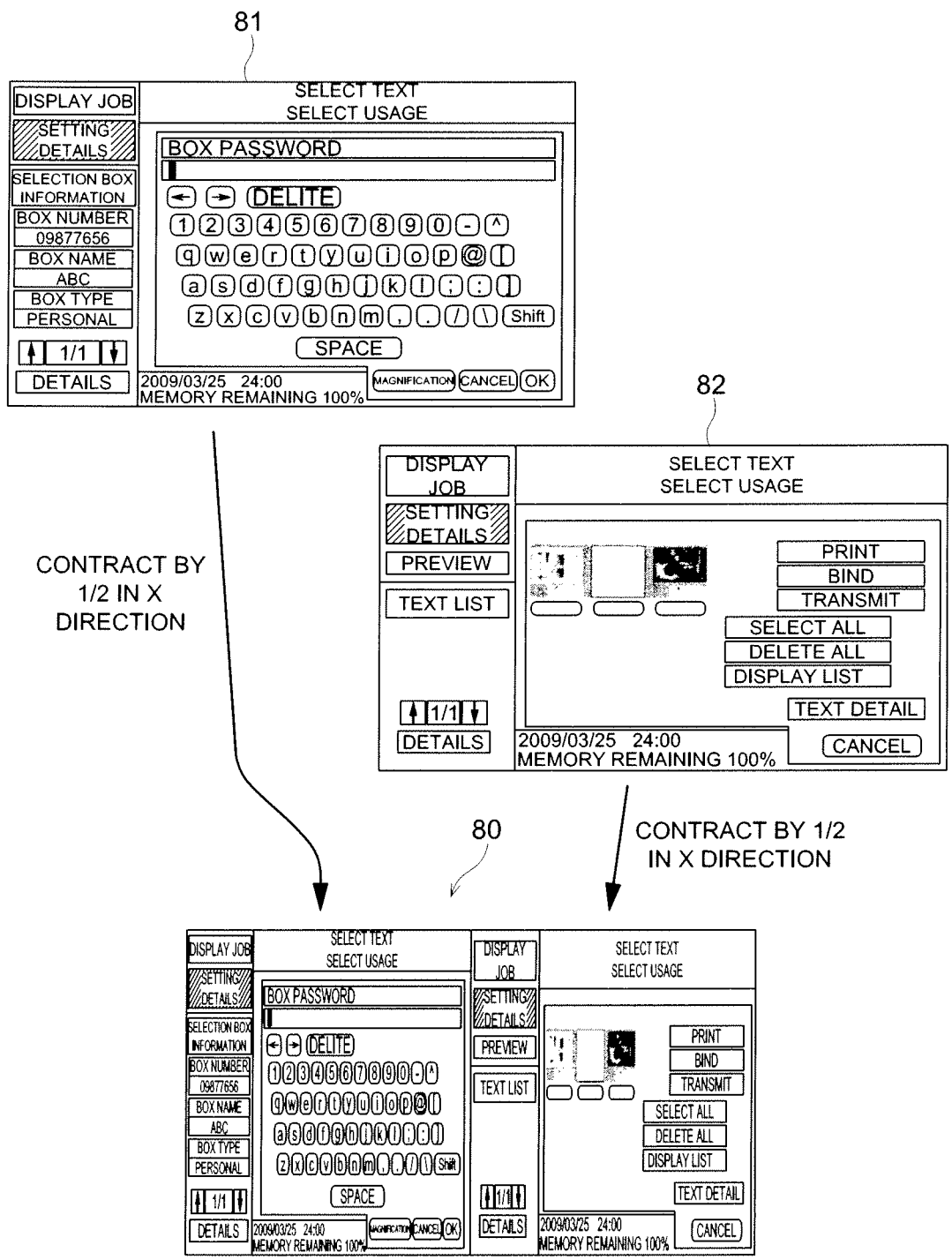
FIG. 12 is a composition screen of a password input screen and a thumbnail screen.

In case a combined instructs to display the combined screen (the combined screen of the password input screen and the thumb nail screen) (Step S504; combining), the combined screen of the password input screen and the thumb nail screen is subject to rasterizing and developed to be displayed on the operation display section 18 (Step S506). For example, as FIG. 12 shows, the password input screen 81 as a single screen is contracted and allocated so as fit in a left half display area of the operation display section 18, and a thumbnail screen 82 as a single screen is contracted and allocated so as fit in a right half display area of the operation display section 18, thus a composition screen 80 is created.

Also, the positional information of the operation buttons indicated by the function information of each composition operation screen is converted in accordance with allocation and contracted size after combining the operation screen, the function information after conversion related to a plurality of the operation screens having been combined are enabled (Step S507). For example, in case of composition screen 80 in FIG. 12, processes that the relative position in the X direction indicated by the positional information of the operation buttons in the password input screen 81 is reduced to a half and the relative position in the X direction indicated by the positional information of the operation buttons in the thumbnail screen 82 is reduced to a half, then the thumbnail screen 82 contracted in the X direction is offset in the X direction by the size of password input screen after contracting in the X direction is carried out.

Figure 13:
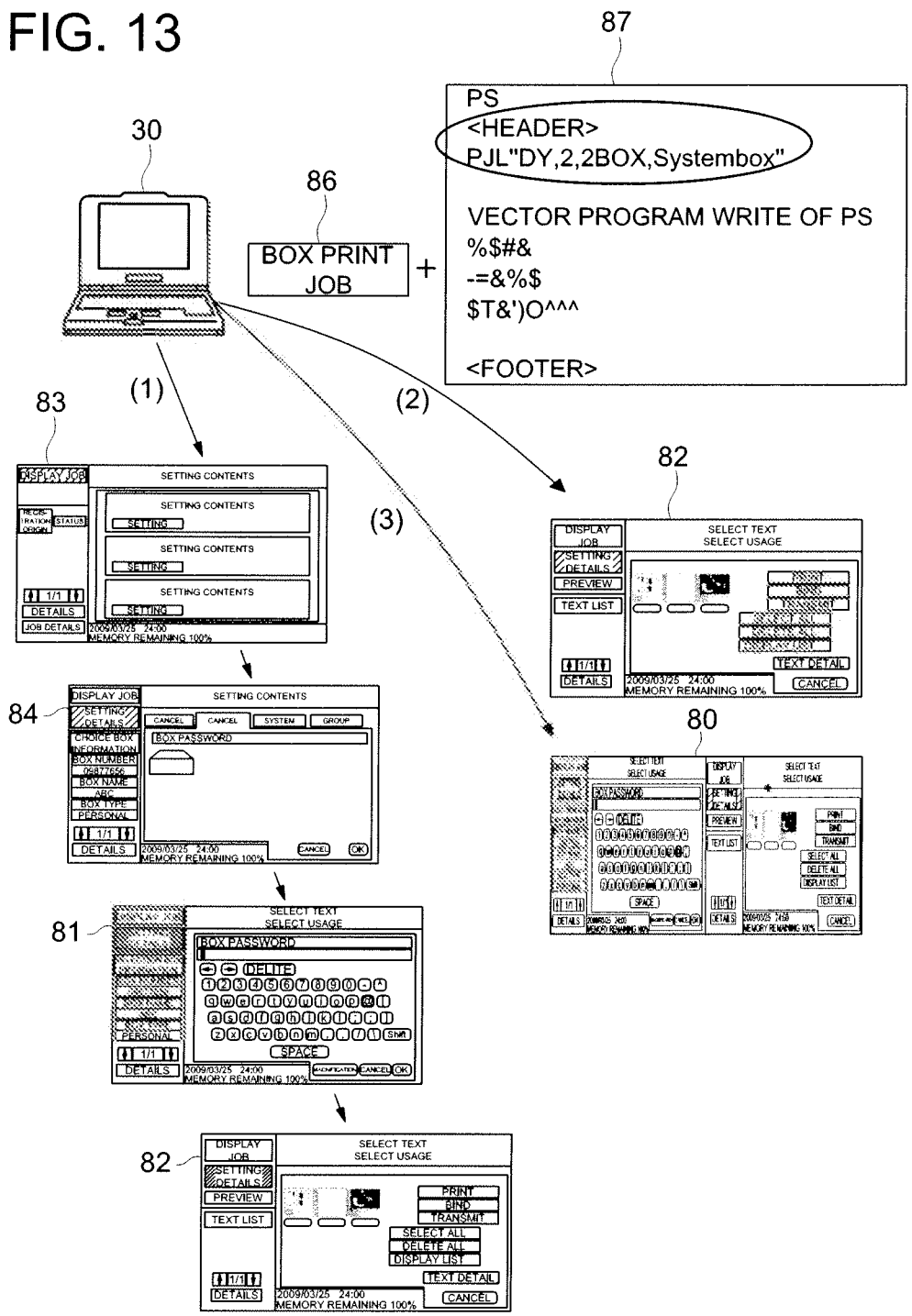
FIG. 13 is an explanatory diagram showing cases where a screen is transited and not transited by a control command in comparison.

FIG. 13 shows transitions of the display screens in comparison, in cases (1) only box printing job is received, (2) box printing job 86 and a control command 87 instructing transition to the single screen (thumbnail screen) are received, (3) the box printing job and the control command instructing transition to the composition screen (the composition screen of the password input screen and the thumbnail screen).

In case of item (1), when the box printing job is completed, an operation menu screen 83 is displayed and then the user operates a predetermined job, whereby the screen transits to a text selection screen 84, and further transits to the password input screen 81, then when a correct password is inputted, the screen transits to the thumbnail screen 82.

Contrarily, in case of item (2), when the box print job is completed, the screen transits to the thumbnail screen 82 directly. Also, in case of item (3) when the box printing job is completed, the screen transits to the composition screen 80 (the composition screen of the password input screen and the thumbnail screen). Thereby operation burden of user after printing is reduced.

<Only Control Command is Transmitted>

Figure 14:
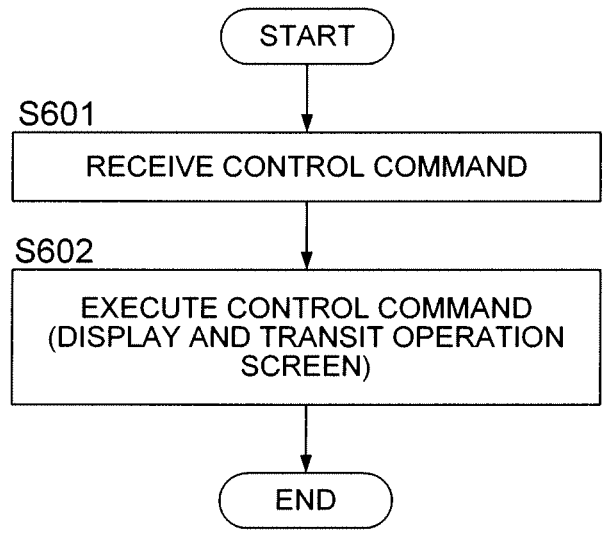
FIG. 14 shows a behavior of a multifunction periphery which receives only a control command form an information processing apparatus.

FIG. 14 shows a behavior of combination periphery 10, in case only the control command (not simultaneously with the print data) is received from the information processing device 30. When the control command is received from the information processing device 30 via the network (Step S601), the combination periphery 10 executes the control command and the screen transits to the operation screen designated by the control command so as to be displayed, and the function information of the screen thereof is enabled (Step S602).

A specific example of the above operation in case the thumbnail screen 82 related to the personal box is displayed, will be described.

Figure 15:
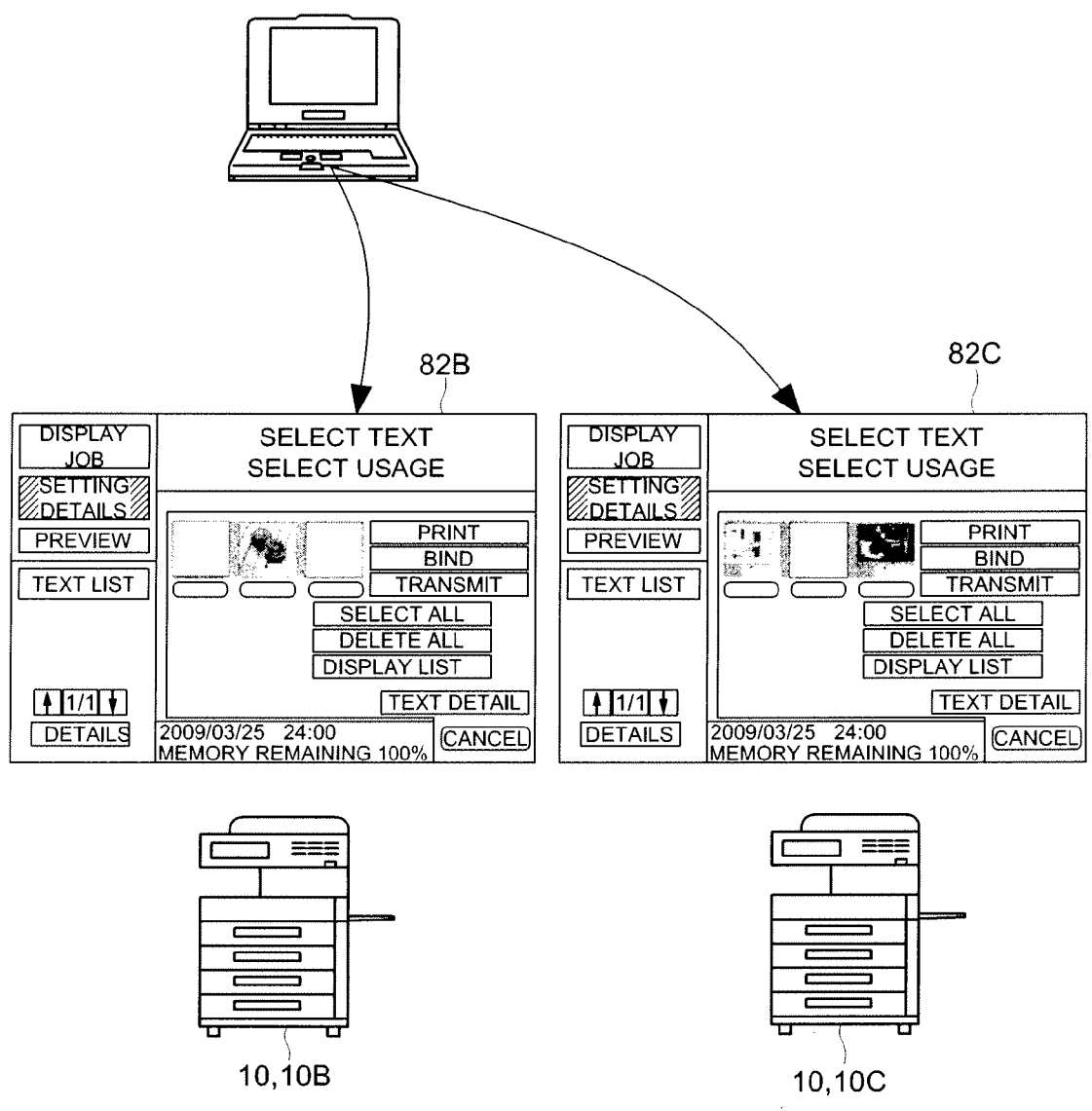
FIG. 15 is an explanatory diagram describing a case where an information processing apparatus sends a control command to display a thumbnail screen related to a predetermined personal box to a plurality of multifunction apparatuses.

FIG. 15 shows a case that the information processing apparatus 30 transmits the control command to instruct displaying of the thumbnail screen 82 related to a predetermined personal box in respect to each of a plurality of multifunction periphery 10B and 100. For example, in case a user forgets which multifunction periphery, either 10B or 10C, stores the desired file, by sending the control commend to display the thumbnail screen 82 of the personal box of the user to the multifunction peripheries 10B and 10C respectively, and by only checking thumbnail screen 82B of the multifunction periphery 10B and the thumbnail screen 82C of the multifunction periphery 10C, the storing location of the target file can be confirmed and printed. In case of the command is sent to more than three multifunction peripheries 10, the above operation can be carried out in the same manner.

Figure 16:
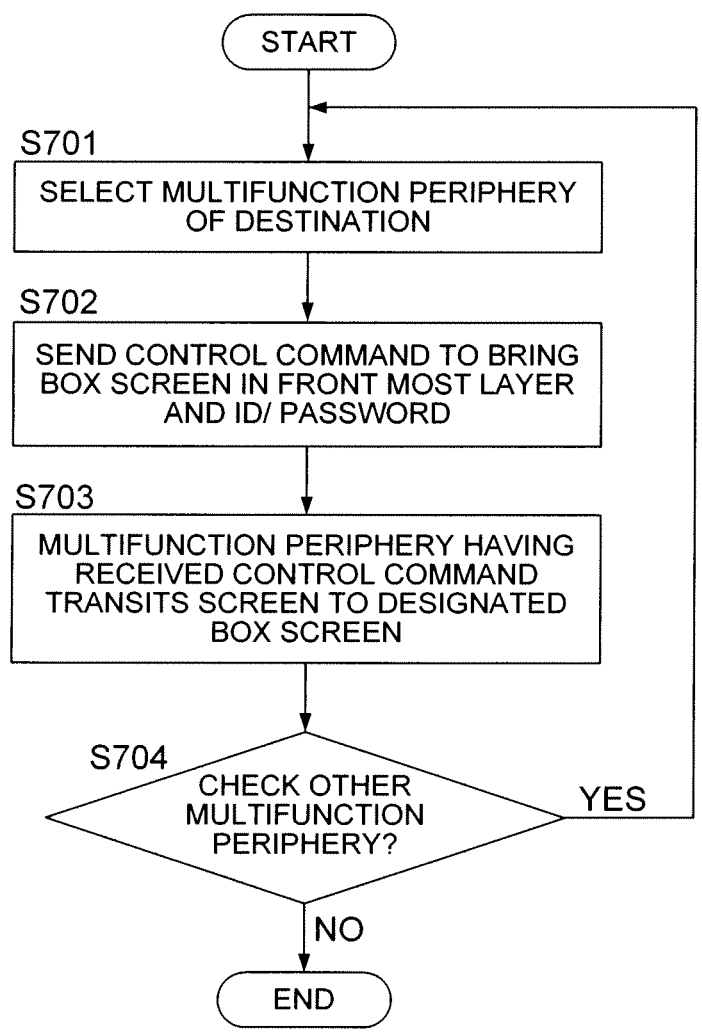
FIG. 16 is a flow chart showing operation in case an information processing apparatus sends a control command to display a thumbnail screen of a personal box to a plurality of multifunction apparatuses.

FIG. 16 shows a operation flow in case the information processing device 30 sends the control command to display the thumbnail screen of the personal box to the plurality of the multifunction peripheries 10. The user selects a multifunction periphery 10 of destination of the control command (Step S701) through the information processing device 30, and the information processing device 30 accepts the selection and sends the control command to display the box screen (to be a front most screen) to the multifunction peripheries 10 with attaching the box ID and the password (Step S702). The information processing apparatus 30 having received the control command, transmits the screen to the thumbnail screen 82 related to the box designated by box ID to display it (Step S703). In case the user wish to send the control command to other multifunction periphery 10 (Step S704; Yes), returning to step S701, the job is terminated if checking of other multifunction periphery 10 is not necessary (Step S704; No). Incidentally, a job flow in case the ID and the password are not necessary to display the personal box, the same job flow can be applied. However, the ID and the password are not necessary to be sent.

As above, the print data for display describing the image of the operation screen and the function related to the control screen is created using the page-description language for printing, and multifunction periphery 10 reads it and creates the operation screen by rasterizing. Whereby, it has an affinity with a printer driver programs, a process of the multifunction periphery 10 to analyze and develop the print data received and programs. Also, by expanding the program, it can be conformed to the display of the operation screen.

Also, since the image of the operation screen is described by the vector information, the operation screen can be reproduced to accord with the display area size, and a composition screen where a plurality of the operation screens are contracted and combined can be created by rasterizing, thus it can cope with the display area size of the operation display section 18 with flexibility. Also, various screens can be provided for the user by combining.

Further, the print data for display 50 includes the image description section 51 describing the image of the operation screen and the function description section 52 where the functions related to the buttons are described, the image of the operation screen and the function of the operation screen (particularly icons and the operation buttons) can be handled as one object.

Also, by sending the control command from the information processing device 30, the screens to be displayed on the operation display section 18 of the multifunction periphery 10, can be directly shifted to a desired deep layer when the printing is executed, and the operation screen can be only transmitted to a desired screen without being accompanied by the job. Also, since the control command is described in the page-description language for printing, it has a good affinity with printer driver programs as well as the print data for display.

Also, for example, by creating the print data for display 50 corresponding to the operation screen through the multifunction periphery 10 of Japanese language and saving it in the external memory medium 6, and by reading the print data for display 50 from the external memory medium 6 at an overseas business travel destination, the operation screen in Japanese can be displayed in overseas. Namely, since the characters in the operation screen are described by the vector information as images, even the muylti-10 not provided with Japanese fonts can display the operation screen in Japanese, which can be applied to other languages.

As above, while the embodiments of the present invention have been described, with reference to the drawings, specific configurations are not limited to the embodiments. Variations and changes may be made without departing from spirit or scope of the claims.

For example, while the control command has been described with examples of transition of the screens (change of layers) and combining of the screen, the control command can be configured so that the command can instruct functions to change color and font type of massage text and to change color and size of icons and operation buttons.

In the embodiment, while the multifunction periphery 10 is preferred to provide with a function to create the print data for display 50 and a function to read the print data for display 50 and reproduce the operation screen, the multifunction periphery 10 can be configured to provide only one function.

In the forgoing, while the multifunction periphery 10 has been described as the example, the printing device not having scanner is possible.

Based on the above embodiments, preferable structures to attain the object of the present invention will be explained hereafter.

[1] A printing apparatus is characterized by having an operation display section, a developing section to create a bitmap image by rasterizing print data described in a page-description language, an input section to input print data for display wherein an operation screen is described in the page-description language, and a control section to display a bitmap image of the operation screen, which is obtained by rasterizing the print data for display inputted through the input section in the developing section, on the operation display section.

In the above printing apparatus, print data for display which describes the operation screen in the page-description language is inputted, and a bitmap image of the operation screen obtained by rasterizing the print data for display in the developing section is displayed on the operation display section. Namely, the image obtained by developing the data described in the printing language is displayed.

[2] The printing apparatus described in [1] is characterized in that the print data for display includes a screen section where the operation screen is described in a first printing language, and a function section where a function related to the operation screen is described in a second printing language, wherein the control section conducts the function described in the function section in accordance with operation of the operation screen.

In the above printing apparatus, the operation screen and the function thereof are described in different languages. For example, the operation screen is described in the first language which is suitable for describing the screen, and the function related to the operation screen is described in the second language which is suitable for describing the function thereof. While describing the operation screen and the function thereof in the different languages, they can be handled as one object.

[3] The printing apparatus described in [2] is characterized in that the first printing language is a printing language wherein a description object is described by vector information and the second printing language is a printing language for printer control.

In the above printing apparatus, the operation screen is described in the vector information. Whereby, the fine operation screen can be obtained by rasterizing while carrying out magnification and contraction. Also, the function is described in printing language for printer control such as PJL and PDL.

[4] The printing apparatus described in [2] or [3] is characterized in that the function section includes positional information of an operation button in the operation screen and information to define an operation of the operation button when the operation button is operated.

In the above printing apparatus, the function section in the print data for display defines the positional information to indicate location of the operation button in the operation screen and function (behavior and transition of the screen) when the button is pressed.

[5] The printing apparatus described in any one [2] to [4] is characterized in that the control section controls to display the bitmap image of the operation screen on the operation display section in accordance with a control command described in the second printing language aside from the function section included in the print data for display.

In the above printing apparatus, aside from the print data for display, by sending the control command from the information processing apparatus to the printing apparatus, the operation screens to be displayed on the display operation section can be controlled individually.

[6] The printing apparatus described in [5] is characterized in that the control section controls to layout the bitmap image of the operation screen in accordance with the control command when the bitmap image of the operation screen is displayed in a display area on the operation display section.

In the above printing apparatus, it becomes possible that the plurality of the operation screens are combined, a proportion of each screen occupies is set at a combining process and only a portion of the screen is magnified.

[7] The printing apparatus described in [5] is characterized in that the control section controls to display the bitmap image of the operation screen designated by the control command on the operation display section.

In the above printing apparatus, the screen can be transmitted discretionary by the control command.

[8] The printing apparatus described in [5] is characterized in that print data and the control command are received, and when printing related to the print data is carried out, the control section controls to display the bitmap image of the operation screen obtained by rasterizing the print data for display on the operation display section in accordance with the control command.

In the above printing apparatus, when printing is carried out, the operation screen to be displayed at printing (including after printing) can be designated by the control command.

[9] The printing apparatus described in any one [1] to [8] is characterized in that the bitmap image of the operation screen having a size corresponding to a display area of the operation display section is created from the print data for display.

In the above printing apparatus, even the display area size of the operation display section varies, the operation screen having a size in accordance with the size of the display area is created by rasterizing.

[10] A printing apparatus is characterized by having an operation display section, a memory section to store display data of an operation screen to be displayed on the operation display section, a creation section to create printing data for display where the operation screen is described in a page-description language from the display data stored in the memory section, and an output section to output the printing data for display created by the creation section.

In the above printing apparatus, the print data for display described in the page-description language can be created from the operation screen to be displayed on the operation display section of own apparatus and outputted to an outside.

[11] The printing apparatus described in [10] is characterized in that the print data for display includes a screen section where an operation screen is described in a first printing language, and a function section where a function related to the operation screen is described in a second printing language.

In the above printing apparatus, the operation screen and the function thereof are described in different languages, For example, the operation screen is described in the first language which is suitable for describing the screen, and the function related to the operation screen is described in the second language which is suitable for describing the function thereof. While describing the operation screen and the function thereof in the different languages, they can be handled as one object.

[12] The printing apparatus described in [11] is characterized in that the first printing language is a printing language wherein a description object is described by vector information and the second printing language is a printing language for printer control.

In the above printing apparatus, the operation screen is described in the vector information. Whereby, the fine operation screen can be obtained by rasterizing while carrying out magnification and contraction. Also, the function is described in printing language for printer control such as PJL.

[13] The printing apparatus described in [11] or [12] is characterized in that the function section includes positional information of an operation button in the operation screen and information to define operation of the operation button when the operation button is operated.

In the above printing apparatus, the function section in the print data of display defines the positional information to indicate location of the operation button in the operation screen and the function (behavior and transition of the screen) when the button is pressed.

[14] A recording medium for a computer to read, storing a computer program to operate an information processing apparatus so as to create print data for display described in a page-description language for an operation screen of a printing apparatus.

In the above recording medium, the information processing apparatus operates in accordance with the program to create print data for display where the operation screen of the printing apparatus is described in the page-description language.

[15] The recording medium for a computer to read, storing the computer program described in [14] is characterized in that the print data for display includes a screen section where an operation screen is described in a first printing language, and a function section where a function related to the operation screen is described in a second printing language.

In the above recording medium, the operation screen and the function thereof are described in different languages, For example, the operation screen is described in the first language which is suitable for describing the screen, and the function related to the operation screen is described in the second language which is suitable for describing the function thereof. While describing the operation screen and the function thereof in the different languages, they can be handled as one object.

[16] The recording medium for a computer to read, storing the computer program described in [15] is characterized in that the first printing language is a printing language wherein a description object is described by vector information and the second printing language is a printing language for printer control.

In the above recording medium, the operation screen is described in the vector information. Whereby, the fine operation screen can be obtained by rasterizing while carrying out magnification and contraction. Also, the function is described in the printing language for printer control such as PJL.

[17] The recording medium for a computer to read, storing the computer program described in [15] or [16] is characterized in that the function section includes positional information of an operation button in the operation screen and information to define an operation of the operation button when the operation button is operated.

In the above recording medium, the function section in the print data of display defines the positional information to indicate location of the operation button in the operation screen and the function (behavior and transition of the screen) when the button is pressed.

[18] The recording medium for a computer to read, storing the computer program described in any one [15] to [17] to operate the information processing apparatus to create a control command described in the second language to control display of a bitmap image of the operation screen obtained by rasterizing the print data for display on the operation display section of the printing apparatus aside from the print data for display.

In the above recording medium, the operation screen to be displayed on the display operation section can be controlled by the control command aside from the print data for display.

[19] The recording medium for a computer to read, storing the computer program described in [18] is characterized in that the control command includes an instruction to control layout of the operation screen within a display area of the operation display section of the printing apparatus when the operation screen based on the print data for display is displayed within the display area of operation display section of the printing apparatus.

In the above recording medium, it becomes possible that the plurality of the operation screens are combined, an occupancy proportion of each screen at combining is set and only a portion of the screen is magnified.

[20] The recording medium for a computer to read, storing the computer program described in [18] is characterized in that the control command includes an instruction to designate the operation screen to be displayed on the operation display section of the printing apparatus.

In the above recording medium, the screen can be transmitted discretionary by the control command.

[21] The recording medium for a computer to read, storing the computer program described in [18] to operate the information processing apparatus, wherein a control command to control display of the operation screen based on the print data for display on the printing apparatus is created and print data and the control command are sent to the printing apparatus, while printing based on the print data is carried out.

In the above recording medium, when printing is carried out, the operation screen to be displayed at printing (including after printing) can be designated by the control command.

According to the printing apparatus and the program of the present invention, various operation screens can be displayed without preparing various layouts of the screens and various fonts of languages even if the apparatus is not in the connection environment with the server.

What is claimed is:

1. A printing apparatus, comprising:
an operation display section;
a developing section to create a bitmap image by rasterizing print data described in a page-description language;
an input section to input print data for display wherein an operation screen is described in the page-description language, and
a control section to display a bitmap image of the operation screen, which is obtained by rasterizing the print data for display inputted through the input section in the developing section, on the operation display section.

2. The printing apparatus of claim 1, wherein the print data for display includes:
a screen section where the operation screen is described in a first printing language, and
a function section where a function related to the operation screen is described in a second printing language,
wherein the control section conducts the function described in the function section in accordance with operation of the operation screen.

3. The printing apparatus of claim 2, wherein the first printing language is a printing language wherein a description object is described by vector information and the second printing language is a printing language for printer control.

4. The printing apparatus of claim 3, wherein the function section includes positional information of an operation button in the operation screen and information to define an operation of the operation button when the operation button is operated.

5. The printing apparatus of claim 2, wherein the control section controls to display the bitmap image of the operation screen on the operation display section in accordance with a control command described in the second printing language aside from the function section included in the print data for display.

6. The printing apparatus of claim 5, wherein the control section controls to layout the bitmap image of the operation screen in accordance with the control command when the bitmap image of the operation screen is displayed in a display area on the operation display section.

7. The printing apparatus of claim 5, wherein the control section controls to display the bitmap image of the operation screen designated by the control command.

8. The printing apparatus of claim 5, wherein print data and the control command are received, and when printing related to the print data is carried out, the control section controls to display the bitmap image of the operation screen obtained by rasterizing the print data for display on the operation display section in accordance with the control command.

9. The printing apparatus of claim 1, wherein the bitmap image of the operation screen, having a size corresponding to a display area of the operation display section, is created from the print data for display.

10. A printing apparatus, comprising:
an operation display section;
a memory section to store display data of an operation screen to be displayed on the operation display section;
a creation section to create print data for display, where the operation screen is described in a page-description language, from the display data stored in the memory section; and
an output section to output the print data for display created by the creation section to an outside.

11. The printing apparatus of claim 10, wherein the print data for display includes:
a screen section where an operation screen is described in a first printing language, and
a function section where a function related to the operation screen is described in a second printing language.

12. The printing apparatus of claim 11, wherein the first printing language is a printing language wherein a description object is described by vector information and the second printing language is a printing language for printer control.

13. The printing apparatus of claim 11, wherein the function section includes positional information of an operation button in the operation screen and information to define operation of the operation button when the operation button is operated.

14. A non-transitory recording medium for a computer to read, storing a computer program to operate an information processing apparatus so as to create print data for display described in a page-description language for an operation screen of a printing apparatus, wherein the print data for display includes:
a screen section where an operation screen is described in a first printing language, and
a function section where a function related to the operation screen is described in a second printing language.

15. The non-transitory recording medium for a computer to read, storing the computer program of claim 14, wherein the first printing language is a printing language wherein a description object is described by vector information and the second printing language is a printing language for printer control.

16. The non-transitory recording medium for a computer to read, storing the computer program of claim 14, wherein the function section includes positional information of an operation button in the operation screen and information to define an operation of the operation button when the operation button is operated.

17. The non-transitory recording medium for a computer to read, storing the computer program of claim 14 to operate the information processing apparatus to create a control command described in the second language to control display of a bitmap image of the operation screen obtained by rasterizing the print data for display on the operation display section of a printing apparatus aside from the print data for display.

18. The non-transitory recording medium for a computer to read, storing the computer program of claim 17, wherein the control command includes an instruction to control layout of the operation screen within a display area of the operation display section of the printing apparatus when the operation screen based on the print data for display is displayed within the display area of operation display section of the printing apparatus.

19. The non-transitory recording medium for a computer to read, storing the computer program of claim 17, wherein the control command includes an instruction to designate the operation screen to be displayed on the operation display section of the printing apparatus.

20. The non-transitory recording medium for a computer to read, storing the computer program of claim 17 to operate the information processing apparatus, wherein that a control command to control display of the operation screen based on the print data for display on the printing apparatus is created and print data and the control command are sent to the printing apparatus, while printing based on the print data is carried out.

* * * * *